United States Patent [19]

Nishikawa et al.

[11] Patent Number: 5,415,034
[45] Date of Patent: May 16, 1995

[54] ROBOT FOR DRIVING AUTOMOBILE ON CHASSIS DYNAMOMETER

[75] Inventors: Masanori Nishikawa, Kyoto; Yasuhiro Ogawa, Kameoka; Shinji Noguchi, Kyoto, all of Japan

[73] Assignee: Horiba, Ltd., Japan

[21] Appl. No.: 940,000

[22] Filed: Sep. 3, 1992

[30] Foreign Application Priority Data

Sep. 10, 1991 [JP] Japan ............. 3-081482 U

[51] Int. Cl.⁶ ................................ G01M 15/00
[52] U.S. Cl. ........................................... 73/117
[58] Field of Search ............. 73/117, 132; 248/499, 248/503, 503.1, 506, 690, 693; 254/DIG. 5

[56] References Cited

U.S. PATENT DOCUMENTS

| 1,950,640 | 3/1934 | Twyman | 73/132 |
| 2,563,698 | 8/1951 | Whitebread | 248/499 |
| 3,662,593 | 5/1972 | Pirrello et al. | 73/132 |
| 3,713,332 | 1/1973 | Herrbrich | 73/117 |
| 3,884,404 | 5/1975 | Frost | 248/499 |
| 4,554,824 | 11/1985 | King et al. | 73/117 |
| 5,012,689 | 5/1991 | Smith | 254/DIG. 5 |

FOREIGN PATENT DOCUMENTS

| 1376438 | 9/1964 | France | 73/132 |
| 2236366 | 3/1991 | United Kingdom | 254/DIG. 5 |

*Primary Examiner*—Robert Raevis
*Attorney, Agent, or Firm*—Poms, Smith, Lande & Rose

[57] ABSTRACT

The driving robot placed on the driver's seat can be easily and surely fixed. The supporting rod 4 is laid on the front side of the body 2 of the robot 1, connected with the end portions of the belts 38 and provided with the hook 45 at the other ends thereof. And, the body 2 is placed on the seat 34 of the driver's seat 33 and the hook 45 of the belt 38 is engaged with the chassis 37 to fix the body 2.

2 Claims, 9 Drawing Sheets

ROBOT FOR DRIVING AUTOMOBILE ON CHASSIS DYNAMOMETER

BACKGROUND OF THE INVENTION

1. Field of the Invention

The present invention relates to a robot for driving an automobile in the case where a performance test and others of said automobile are carried out by the use of a chassis dynamometer.

2. Description of the Prior Art

In an emission test and a fuel-consumption test and others of an assembled automobile and the like by driving under various kinds of mode, said automobile has been driven in accordance with a previously appointed driving pattern on a chassis dynamometer. And, this travelling of the automobile has been carried out by a robot to for example save a labor and improve a reproducibility in driving. A robot for driving a motorcar shown in for example FIG. 15 has been disclosed in Japanese Patent Application No. Hei 2-280,478.

Referring to FIG. 15, reference numeral 71 designates a robot and reference numeral 72 designates a body constructing said robot 71 and provided with a supporting rod 74 laid over pointed ends of a pair of fitting bars 73 fixedly mounted on both ends of an upper surface thereof and projected forward therefrom. Reference numeral 75 designates a supporting groove formed in a convex sectional shape and reference numeral 76 designates a plurality of fitting members mounted on said supporting groove 75 at end portions thereof and provided with an actuator 77 operating each pedal of a automobile. Reference numeral 78 designates said actuator for use in a shift lever provided in the body 72, reference numeral 79 designating a rear portion support provided in a rear portion of the body 72, and reference numeral 80 designating a supporting leg member consisting of a table 83 provided at an upper end of a support 82 standing on a base plate 81. Reference numeral 84 designates a driver's seat placed on the body 72 and mounted on a slide rail 85. Reference numeral 86 designates belts for fixedly mounting front and rear portions of the body 72 on said driver's seat 84 and hooks in the respective end portions of said belts 86 are engaged with said fitting bars 73 and said slide rail 85, respectively. And, the belts 86 are arranged on both sides of the body 72.

The robot 71 having the above described construction places the body 72 on the driver's seat 84 of the automobile and puts the supporting rod 74 on said table 83 of said supporting leg member 80 placed on a floor of the automobile to support said front portion of the body 72. And, the belts 86 are extended over the fitting bars 73 and the slide rail 85 to fixedly mount the body 72 on the driver's seat 84. In addition, the respective fitting members 76 are moved along the supporting groove 75 so that the respective actuators 77 may face to said each pedal and each pedal can be operated at a pointed end of each actuator 77.

In the above described conventional robot 71, in order to place the robot 71 on the driver's seat 84 and fixedly mount the body 72 of the robot 71 on the driver's seat 84, the belts 86 are extended over the fitting bars 73 and the slide rail 85 of the body 72 on both sides of the robot 71. However, a distance between the driver's seat 84 and a console on the side of said shift lever is reduced according to kinds of automobile. Accordingly, a problem has occurred in that the hooks of the belts 86 are difficult to be engaged with the slide rail 85 on the side of the shift lever and it is difficult to confirm an engaged condition between them according to circumstances. Also on the door side, in the automobile provided with a cover between the driver's seat 84 and the slide rail 85, it is necessary to separate said cover and then engage the hooks with the slide rail 85. In addition, it is difficult to separate the cover according to constructions of the driver's seat 84, so that it is difficult to engage the hooks with the slide rail 85 from the side portion of the driver's seat 84 according to circumstances. Moreover, there is the possibility that for example if the hooks of the belts 86 are insufficiently engaged with the slide rail 85, the hooks of the belts 86 are separated from the slide rail 85 due to a force and a vibration acting upon the belts 86 by an operation of the pedal by means of the respective actuators 77 and the like, a swing of the chassis during the driving and the like to move the body 72, whereby the operation of the respective pedals by the actuators 77 becomes inaccurate or the driving becomes difficult. Furthermore, a force lifting up the front end side of the body 72 repeatedly acts when pedalled by means of the actuators 77, so that there is also the possibility that the respective belts 86 arranged on both sides of the body 72 are moved rearwardly to produce a change in the fixed condition of the body 72.

SUMMARY OF THE INVENTION

The present invention solves the above described problems and it is an object of the present invention to provide a robot for driving a automobile on a chassis dynamometer capable of easily and stably fixing said robot placed on a driver's seat of said automobile.

A robot for driving a automobile on a chassis dynamometer, in which the respective actuators for operating the respective pedals and the respective shift levers of said automobile are provided in a body placed on a driver's seat, according to the present invention is characterized in for example belt-shaped or wire-shaped connecting members made of flexible materials for fixedly mounting said body on said driver's seat are mounted on a supporting member laid on a front portion of the body at end portions thereof and engaging members to be engaged with the driver's seat and others are mounted on the other end of said connecting members.

The connecting members, which are flexible like a belt or a wire made from a textile of natural or synthetic fibers and can fix the body of the robot placed on the driver's seat, can be optionally used. In addition, said end portions of the connecting members can be optionally mounted on said supporting member, that is they can be mounted on the supporting member not so as to be separated or so as to be separated. The hook to be mounted on the other end of the supporting member has a construction corresponding to a member to be engaged therewith. And, the connecting members may be adjustable in length or have a previously appointed suitable length.

The body of the robot for driving a automobile on a chassis dynamometer according to the present invention is placed on the driver's seat. And, the engaging members on the other end of the connecting members mounted on the supporting member provided in the front portion of the body at the end portions thereof are engaged with suitable places of a rigid body, such as chassis, exposed on the lower side of the driver's seat, the slide rail of the driver's seat and others to fixedly mount the body on the driver's seat. Since the end portions of the connecting members are mounted on the front side of the body to fixedly support the body in the above described manner, the change in the fixed condition of the body by the connecting members due to the forces repeatedly acting upon the body when for example pedalled by means of the actuators can be easily prevented from being produced and thus the body can be fixedly supported in high stability.

DETAILED DESCRIPTION OF THE PREFERRED EMBODIMENT

Figure 1:
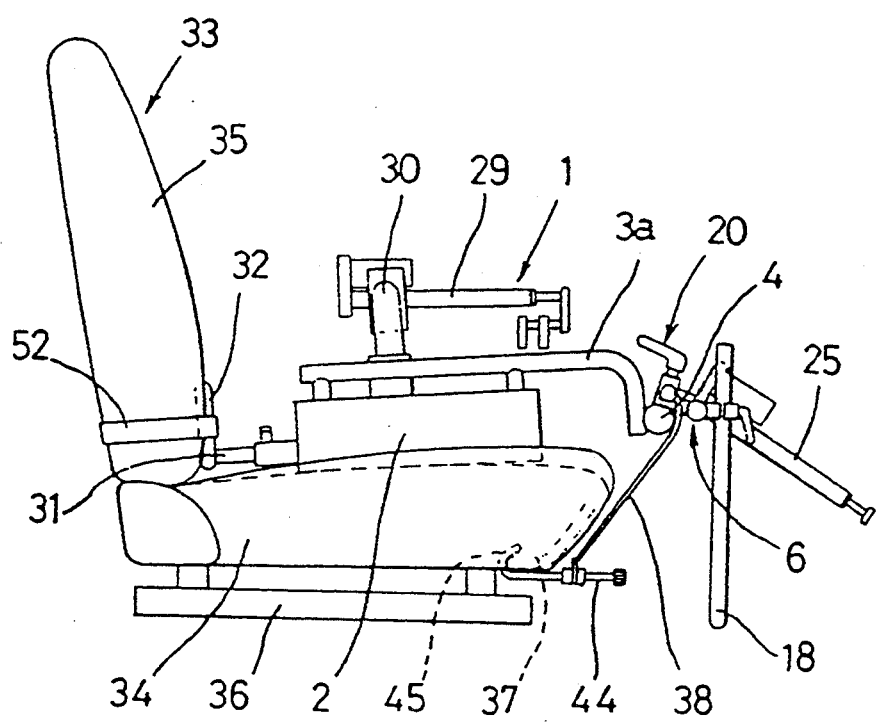
FIG. 1 is a front view showing a first preferred embodiment.
Figure 2:
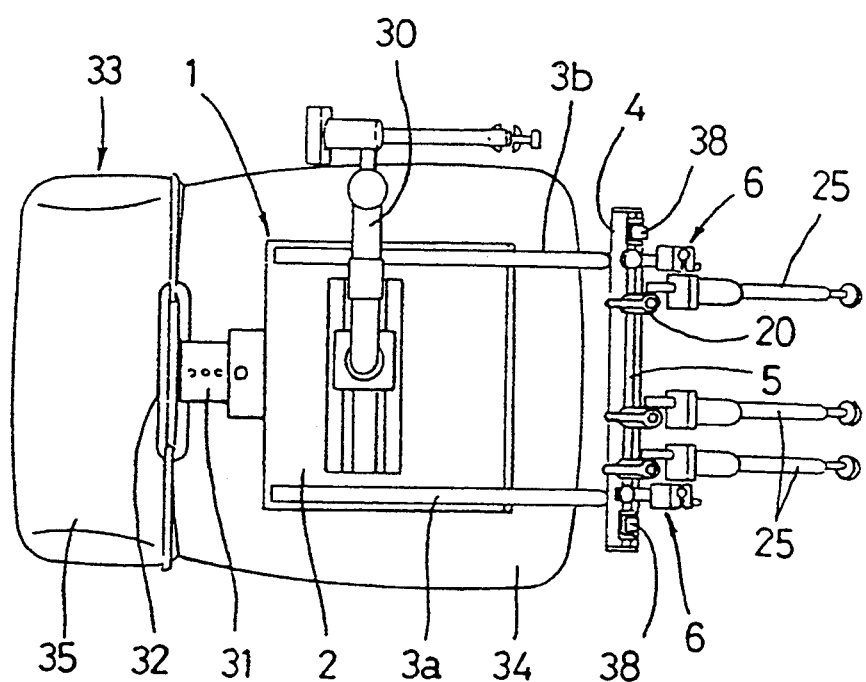
FIG. 2 is a plan view showing said first preferred embodiment.

The first preferred embodiment of the robot for driving a automobile on a chassis dynamometer according to the present invention is described with reference to FIGS. 1 to 7.

Referring to FIGS. 1 to 7, reference numeral 1 designates a robot and reference numeral 2 designates a body constructing said robot 1 and provided with fitting bars 3a, 3b fixedly mounted on both end portions of an upper surface thereof to project forward, a supporting rod 4 as a support laid over said end portions of said fitting bars 3a, 3b and a supporting groove 5 formed all over the length of said supporting rod 4. Said supporting groove 5 has a convex section and a construction that a mouth portion side thereof is narrower than a bottom side thereof (refer to FIG. 3).

Figure 3:
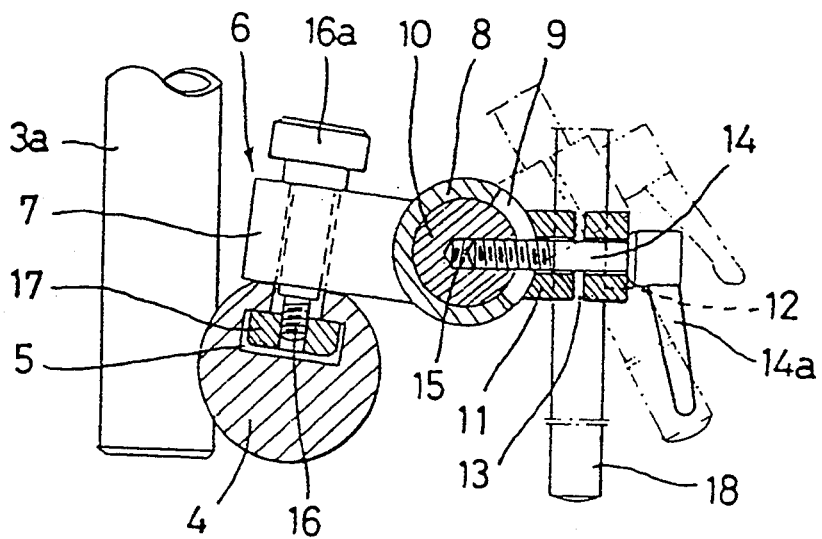
FIG. 3 is an enlarged sectional view showing a supporting rod-fitting portion in the first preferred embodiment.

Reference number 6 designates a holding member comprising a bearing pipe 8 fixedly mounted on an end portion of a connecting member 7, a long hole 9 having an increased length in the circumferential direction of said bearing pipe 8 and a supporting shaft 10 inserted into the bearing pipe 8 as shown in FIG. 3. In addition, a holding hole 12 is formed in an end portion of a holding member 11 provided along an outer circumferential surface of the bearing pipe 8 and a slit 13 is provided on one side of said holding hole 12 so as to be communicated with the holding hole 12 so that said holding member 11 may be mounted on a circumferential surface of the bearing pipe 8 by screwing a clamping bolt 14 passing through a portion, where said slit 13 is provided, of the holding member 11 in a tapped hole 15 of said supporting shaft 10 through said long hole 9. And, an end portion of a connecting bolt 16 passing through the other end of said connecting member 7 is screwed in a nut 17. Reference numeral 14a designates a handle of said clamping bolt 14 and reference numeral 16a designates a handle of said connecting bolt 16. The respective holding members 6 having the above described construction are mounted on both end portions of the supporting rod 4 by engagedly inserting said nut 17 into an increased-width portion of the supporting groove 5 and inserting said connecting bolt 16 in a reduced-width portion of the supporting groove 5. Accordingly, upon screwing up the connecting bolt 16 through said handle 16a, the nut 17 is pressed against an inner surface of the supporting groove 5 and the connecting member 7 is pressed against an outer surface of the supporting rod 4, respectively, whereby the holding member 6 is fixedly mounted on the supporting rod 4, and, upon unfastening the connecting bolt 16, the holding member 6 is made slidable relatively to the supporting rod 4.

Reference numeral 18 designates supporting rods slidably inserted into the respective holding holes 12. Upon screwing up the respective clamping bolts 14, the holding holes 12 are screwed up by the slit 13 to fix said supporting rods 18 and the holding member 11 and the supporting shaft 10 is pressed against the inner circumferential surface of the bearing pipe 8, respectively, to fixedly mount the holding member 11 on the bearing pipe 8. In addition, upon unfastening the respective clamping bolts 14, the supporting rod 18 is made slidable and the holding member 11 is made swingable within the range of the long hole 9, as shown by a chain line.

Figure 4:
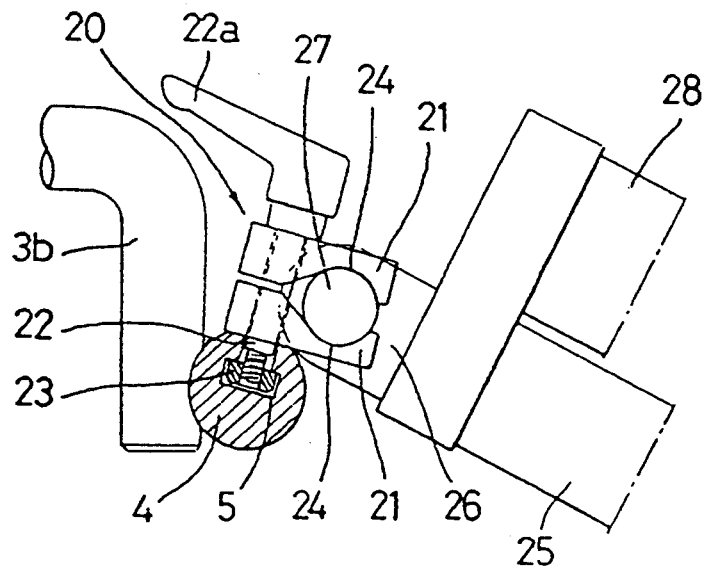
FIG. 4 is an enlarged sectional view showing an actuator-fitting portion in the first preferred embodiment.

Reference numeral 20 designates a plurality of supporting members comprising a pair of sandwiching plates 21, 21 put one upon another, a fitting bolt 22 passing through end portions of said sandwiching plates 21, 21, a clamping nut 23, in which an end portion of said fitting bolt 22 is screwed, and sandwiching grooves 24, 24 having an arched section formed on the respective opposite surfaces of the other end portions of the sandwiching plates 21, 21, as shown in FIG. 4. And, a supporting shaft 27 projected on a side surface of a fitting member 25 provided at a base end of an actuator 25 operating a pedal is put between said sandwiching grooves 24, 24 of the sandwiching plates 21, 21 to mount said actuator 25 on said supporting member 20. Reference numeral 22a designates a handle of the fitting bolt 22 and reference numeral 28 designates a servomotor operating the actuator 25. Said clamping nut 23 of the supporting member 20 having the above described construction is engagedly inserted into said increased-width portion of the supporting groove 5 and the fitting bolt 22 is inserted into said reduced-width portion of the supporting groove 5 to slidably provide the respective supporting members 20 in the supporting groove 5. Accordingly, upon screwing up the fitting bolt 22 through said handle 22a, the sandwiching plates 21, 21 are pressed against the supporting rod 4 to fixedly mount the supporting members 20 on the supporting rod 4 and the sandwiching plates 21, 21 pressedly put said supporting shaft 27 therebetween to fix the actuator 25. On the contrary, upon unfastening the fitting bolt 22, the supporting members 20 are made slidable relatively to the supporting rod 4 and the actuator 25 is made swingable in the up and down direction through the supporting shaft 27.

Reference numeral 29 designates an actuator for use in a shift lever mounted on the body 2 by means of a supporting arm 30. Said supporting arm 30 is adapted to be rotated by about 180 degrees in correspondence to handling methods of a automobile so that said actuator 29 can be positioned on the side of said shift lever (not shown). Reference numeral 31 designates a back portion-supporting body provided behind the body 2 so as to be adjustable in projected length and provided with a back portion-supporting member 32 at a pointed end thereof. Reference numeral 33 designates a driver's seat of a automobile comprising a seat 34, a back support 35 and a slide rail 36 for fixedly mounting said seat 34 on a floor surface. Reference numeral 37 designates a chassis constructing the seat 34.

Figure 5:
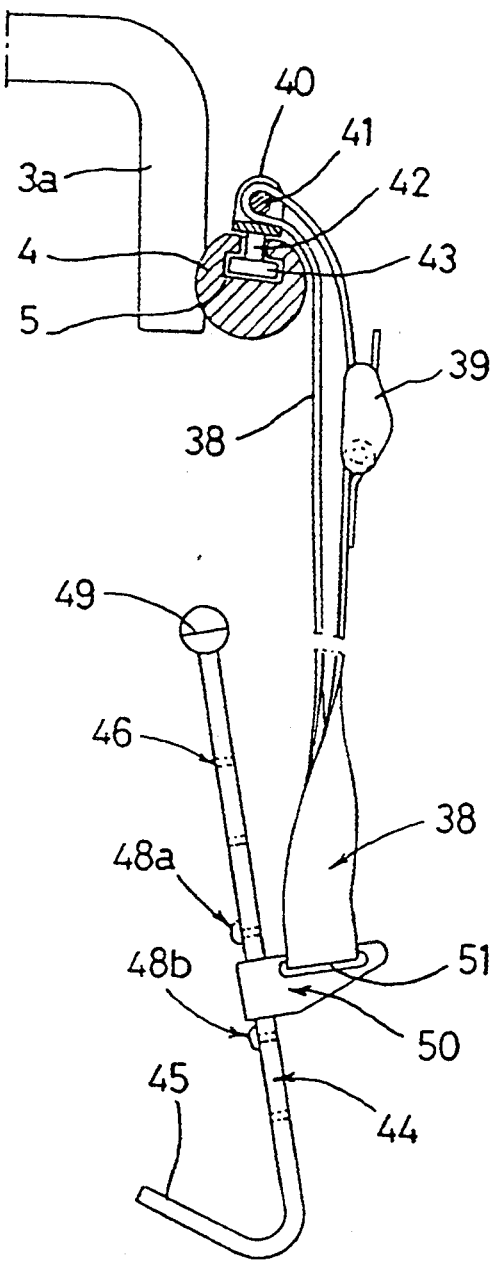
FIG. 5 is an enlarged view showing a belt in the first preferred embodiment.

Reference numeral 38 designates a ring-shaped adjustable-in length belt as a connecting member made of a textile mounted on a length-regulator 39 at one end thereof and supported on the other end side thereof so as to be slidable and fixed by means of said length-regulator 39, whereby being adjustable in length, as shown in FIG. 5. Reference numeral 40 designates a fitting member formed in a concave shape. Said ring-shaped belt 38 is engaged with a supporting pin 41 laid on a wall opposite to said fitting member 40. And, an engaging plate 43 fixedly mounted on a connecting pin 42 projected from the fitting member 40 is engagedly inserted into the increased-width portion of the supporting groove 5 to mount the fitting member 40 on the supporting rod 4. Reference numeral 44 a hook member formed of a metallic rod and provided with a hook 45 as an engaging member at an end portion thereof and a plurality of tapped holes 46 at intervals in a straight portion thereof. Reference numeral 48a, 48b designates a fixing cap screw to be screwed in a pair of adjacent tapped holes 46 of the tapped holes 46, reference numeral 49 designating a knob of said hook member 44, and reference numeral 50 designating a movable member slidably mounted on the hook member 44 so that a position thereof relatively to the hook member 44 may be set between a pair of fixing cap screws 48a, 48b and the belt 38 may be slidably inserted into a fitting hole 51 of said movable member 50. In order to change a position of the movable member 50 relatively to the hook member 44, the fixing cap screw 48a, 48b is suitably separated from the tapped holes 46 to slide the movable member 50. And, the fixing cap screw 48a, 48b is screwed in the tapped screws 46, 46 on both sides of the movable member 50 slid. Since an optional construction, in which the connecting belt 38 is connected in a ring-shaped form and a length of the connecting belt 38 can be regulated by sliding the length-regulator 39, can be given to the length-regulator 39, its detail construction is not shown.

Figure 6:
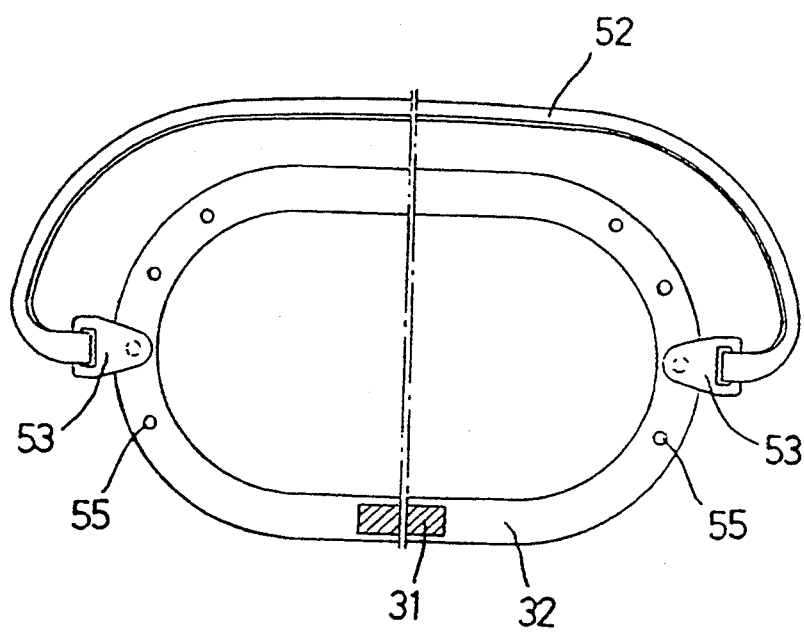
FIG. 6 is an enlarged view showing a back portion support in the first preferred embodiment.
Figure 7:
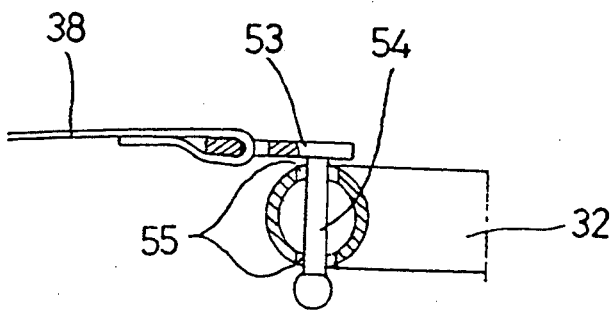
FIG. 7 is an enlarged sectional view showing essential parts in FIG. 6.

Reference numeral 52 designates a back belt provided with engaging plates 53 at both ends thereof and engaging pins 54 with a pointed end having a slightly larger diameter projected from said engaging plates 53, as shown in FIGS. 6, 7, for fixedly mounting a back of the robot 1 on the driver's seat. 33. And, said back portion-supporting member 32 is provided with a plurality of engaging holes 55 (refer to FIG. 7), into which said engaging pins 54 are to be engagedly inserted, at both end portions thereof. In addition, said engaging holes 55 may be formed on a circumferential surface of the back portion-supporting member 32.

In order to mount the robot 1 on the driver's seat 33, the body 2 is placed on the seat 34 with the actuator 25 as the front side and the supporting rod 18 is projected from the front end of the seat 34 to set the position of the body 2. Subsequently, the back portion-supporting member 31 is regulated to engage the back portion-supporting member 32 with said back support 35 so that the body 2 may not be moved to the side of the back support 35. And, the connecting bolts 16 are screwed up by means of the respective handles 16a of the holding members 6 to fixedly mount the respective connecting members 7 on the supporting rod 4. On the other hand, the clamping bolt 14 is unfastened to swing the holding member 11 in the up and down direction relatively to the bearing pipe 8 and make the respective supporting rods 18 almost vertical, the respective supporting rods 18 being downwardly slid to be engaged with the floor and the like of the automobile, and the body 2 being supported by the supporting rods 18 under the condition that the front end side of the body 2 is risen from the seat 34. The respective clamping bolts 14 are screwed up under this condition to fixedly mount the respective holding members 11 on the bearing pipe 8 and fixedly mount the supporting rods 18 on the respective holding members 11.

As above described, after the body 2 placed on the seat 34 is supported by the supporting rods 18 under the condition that the front end side of the body 2 is risen, the hook 45 of the belt 38 mounted on the supporting rod 4 through the fitting member 40 at the end portion thereof is engaged with the chassis 37 exposed on the side below the seat 34 from the front side of the seat 34 and a portion between the supporting rod 4 and the hook member 44 of the belt 38 is strained by tugging the belt 38 supported by the length-regulator 39 at the end portions thereof to fixedly mount the front side of the body 2 on the seat 34. In addition, the hook 45 may be engaged with the slide rail 36 and the like other than the chassis 37. Furthermore, the engaging pins 54 at both ends of the back belt 52 are engagedly inserted into the engaging holes 55 at both ends of the back portion-supporting member 32 under the condition that said back belt 52 is arranged along a back surface of the back support 35, as shown in FIGS. 6, 7, to fixedly mount the back of the robot 1 on the back support 35. Although the back belt 52 is previously set in length almost adjusting to a size of the back support 35, length-regulating means may be provided. And, the respective actuators 25 are positioned at corresponding positions of the respective pedals and regulated in condition so as to be able to operate the respective pedals, whereby fixedly mounting them on the supporting rod 4.

An order of the installing operations of the robot 1 is optionally selected. And, the belt 38, of which hook 45 is engaged with the chassis 37, may be screwed up under the condition that the holding member 11 is slid upward relatively to the supporting rod 18 to lift up the body 2.

As above described, in this robot 1, the hook 45 of the belt 38 mounted on the supporting rod 4 provided on the front side of the body 2 at the end portions thereof is engaged with the chassis 37 from for example the front side of the seat 34, so that it is possible to easily and surely engage the hook 45 with the chassis 37 even on the side of the shift lever and it is possible to eliminate the possibility that for example the hook 45 is separated during the driving of the automobile. In addition, also in the case where the hook 45 is engaged with the slide rail 36 and the like, the hook 45 can be engaged with them from their inside, so that the hook 45 can be easily and surely engaged with the slide rail 36 and the like even in the kind of automobile having a reduced distance between the seat 34 and the console on the side of the shift lever. And, since the body 2 is fixed by means of the belt 38 from the front side thereof, even though other forces are repeatedly applied to the belt 38 when pedalled by means of the actuator 25, there is no possibility that the position, at which the belt is mounted on the supporting rod 4, is shifted and it is possible to hold the body 2 under the almost constant condition. Accordingly, the emission test and the fuel cost test are improved in reproducibility and the shift can be correctly carried out by means of the actuator 25 to continue the mode driving.

Figure 8:
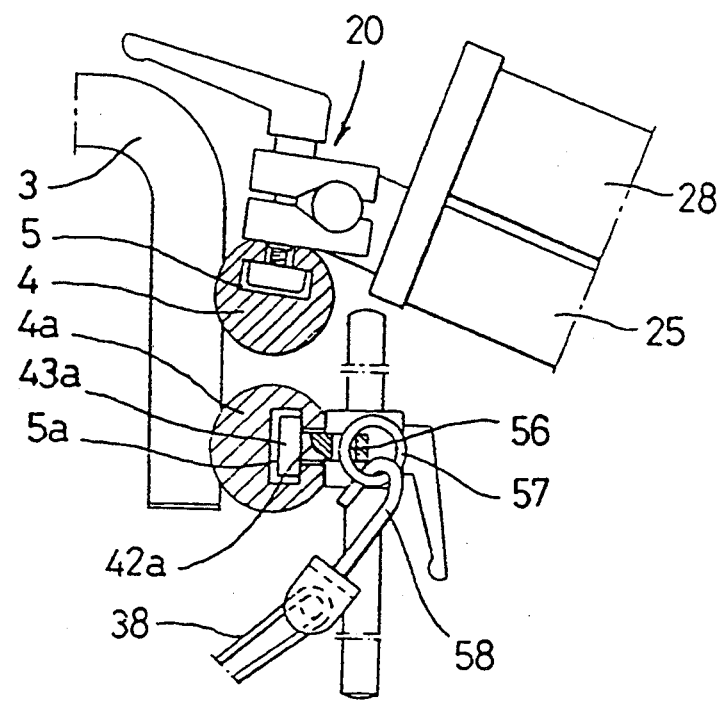
FIG. 8 is an enlarged sectional view showing essential parts in a second preferred embodiment.

FIG. 8 shows said essential parts in said second preferred embodiment. In this second preferred embodiment, an actuator 25 is provided in a supporting groove 5 of a supporting rod 4 laid over end portions of a pair of fitting bars 3 fixedly projected from a body (not shown) through the supporting member 20 shown in the first preferred embodiment.. In addition, a supporting rod 4a as a support is laid over said fitting bars 3 below said supporting rod 4 and a supporting groove 5a having a convex section opened on the front side is formed. And, a hole 56 is formed in a connecting pin 42a projected from an engaging plate 43a engagedly inserted into an increased-width portion of said supporting groove 5a, said hole 56 being provided with an engaging ring 57, and a fitting hook 58 provided in a belt 38 being separatably engaged with said engaging ring 57 to mount end portions of said belt 38 on said supporting rod 4a. Other constructions are same as in the first preferred embodiment, so that they are designated by the same reference numerals as in the first preferred embodiment. In this second preferred embodiment, the belt 38 is separatably mounted on the supporting rod 4a, so that the belt 38 can be separated from the robot 1 and thus the belt 38 is easily handled when the robot 1 is carried in or carried out from the automobile.

In addition, it is possible also to engage the fitting hook 58 with the hole 56 without providing the engaging ring 57. Furthermore, means of mounting the belt 38 on the supporting rod 4a is optionally selected, that is for example the engaging ring 57 may be directly mounted on the supporting rod 4a by means of bolts and the like to engage the fitting hook 58 on the engaging ring 57. And, as obvious from the first and second preferred embodiments, the belt 38 may be mounted on the supporting rod 4 for mounting the actuator 25 or the supporting rod 4a provided separately from the supporting rod 4. Also an opening direction of the supporting groove 5a provided in the supporting rod 4a can be optionally selected.

Figure 9:
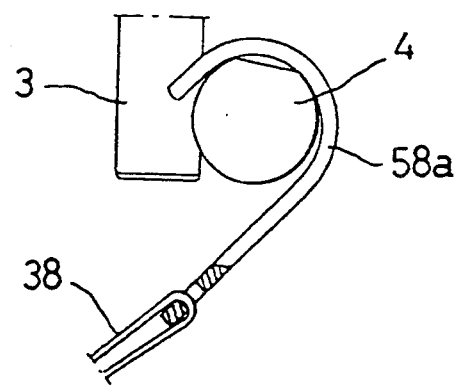
FIG. 9 is an enlarged front view showing essential parts in a third preferred embodiment.

FIG. 9 shows said essential parts in said third preferred embodiment. In this third preferred embodiment, a fitting hook 58a engagable with the supporting rod 4 mounted on the fitting bar 3 is provided in the end portion of the belt 38 and said fitting hook 58a is engaged with the supporting rod 4 when for example the body (not shown) is to be fixed. Accordingly, the belt 38 can be easily handled in the same manner as in the second preferred embodiment.

Figure 10:
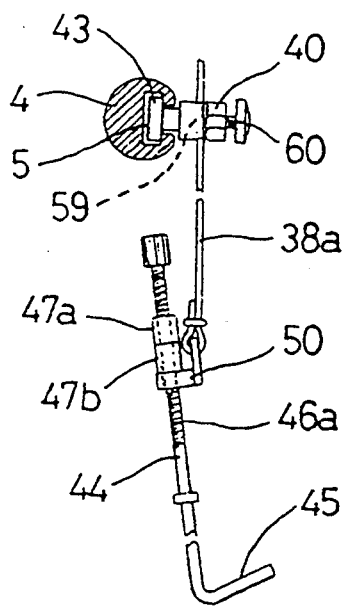
FIG. 10 is an enlarged front view showing essential parts in a fourth preferred embodiment.

FIG. 10 shows said essential parts in said fourth preferred embodiment and relates to the connecting member. In this fourth preferred embodiment, a wire 38a is used as the connecting member and said wire 38a is fixedly mounted on the movable member 50 slidably mounted on the hook member 44 at one end portion and inserted into an inserting hole 59 formed in a fitting member 40a on the other side. And, the wire 38a inserted into said inserting hole 59 is fixedly mounted on the fitting member 40a by means of a lock screw 60 provided in the fitting member 40a so as to be adjustable in length by operating said lock screw 60. The hook member 44 is formed of a metallic rod and provided with the hook 45 at a pointed end thereof and a tapped portion 46a on the side of the other end thereof and adjusting nuts 47a, 47b adjusting the position of the movable member 50 are engaged with said tapped portion 46a. Other constructions are same as in the first preferred embodiment, so that they are designated by the same reference numerals as in the first preferred embodiment.

Figure 11:
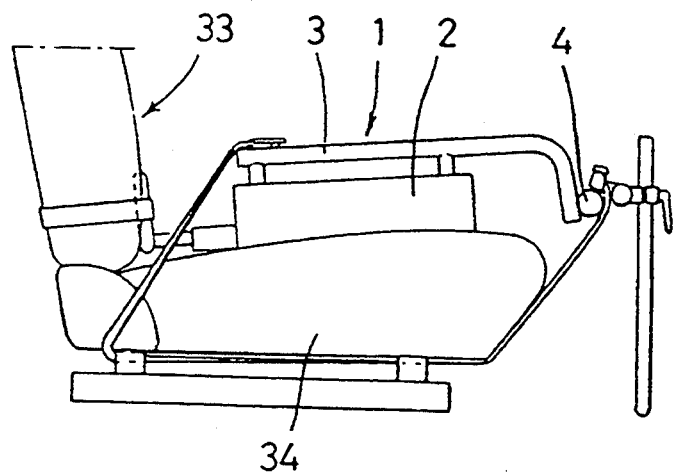
FIG. 11 is an enlarged front view showing essential parts in a fifth preferred embodiment.

FIG. 11 shows said essential parts in said fifth preferred embodiment. In this fifth preferred embodiment, a belt 38 mounted on a supporting rod 4 at end portions thereof is led upward from a rear portion thereof along a lower side surface of a seat 34 to engagedly insert engaging pins (not shown) provided in said end portions into a plurality of engaging holes (not shown) provided on an upper surface side of the fitting bar 3 to fixedly mount the body 2 on the seat 34. Other constructions are same as in the first preferred embodiment.

Figure 12:
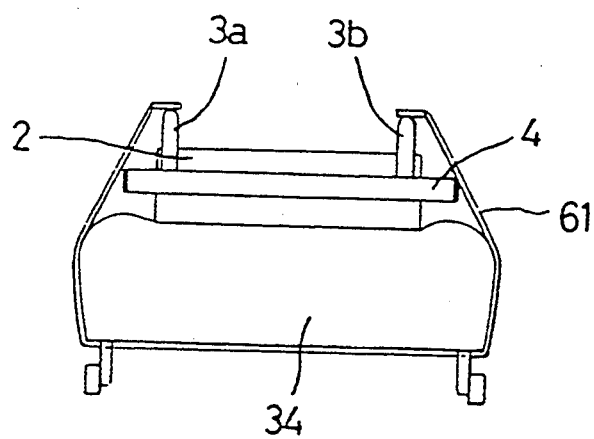
FIG. 12 is a side view showing essential parts in a sixth preferred embodiment.

FIG. 12 shows said essential parts in said sixth preferred embodiment. In this preferred embodiment, a fixing belt 61 is extended along a lower side surface in the direction of width of the seat 34 and then engaging pins (not shown) of said fixing belt 61 are engagedly inserted into engaging holes (not shown) provided on an upper surface side of fitting bars 3a, 3b to fixedly mount the body 2 on the seat 34. The body 2 can be more stably fixed by applying this preferred embodiment together with other preferred embodiments. Other constructions are same as in the first preferred embodiment.

Said engaging pins and said engaging holes in the fifth and sixth preferred embodiment are same as the engaging pins 54 of the belt 38 and the engaging holes 55 provided in the back support 32 shown in FIGS. 6, 7.

Figure 13:
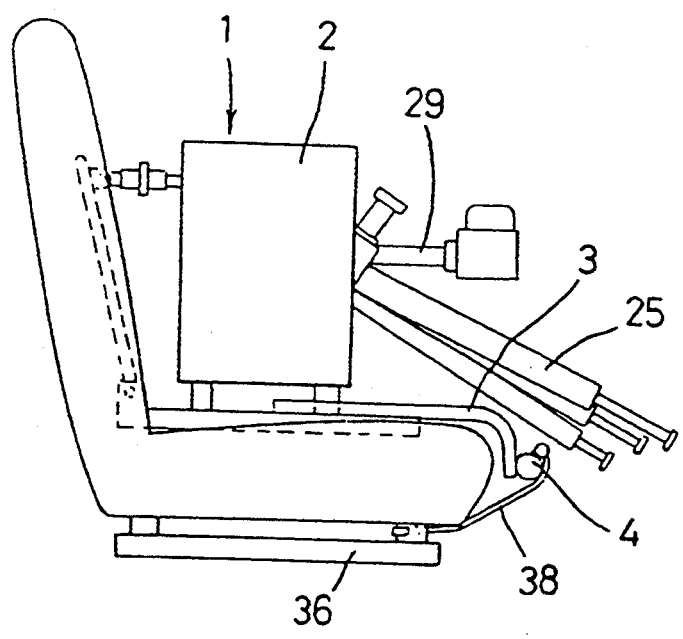
FIG. 13 is a front view showing a seventh preferred embodiment.

FIG. 13 shows said seventh preferred embodiment. In this preferred embodiment, the body 2 of the robot 1 is provided with actuators 25 for operating the respective pedals and an actuator 29 for use in the shift lever. And, the belt 38 is provided in a support groove (not shown) of the supporting rod 4 laid over a pair of fitting bars 3 fixedly mounted on a lower portion of the body 2 at one end thereof and engaged with the slide rail 36 at the other end thereof in the same manner as in the first preferred embodiment. As obvious from the first and seventh preferred embodiments, the construction for mounting the actuators 25 on the body 2 of the robot 1 and the like can be optionally selected and also the provision of the supporting rod 18 in the first preferred embodiment can be optionally selected.

Figure 14:
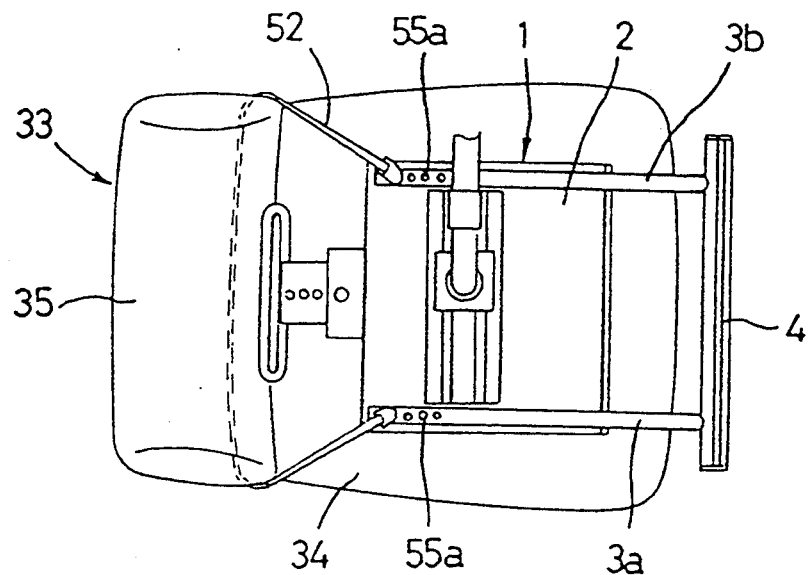
FIG. 14 is a plan view showing essential parts in an eighth preferred embodiment.
Figure 15:
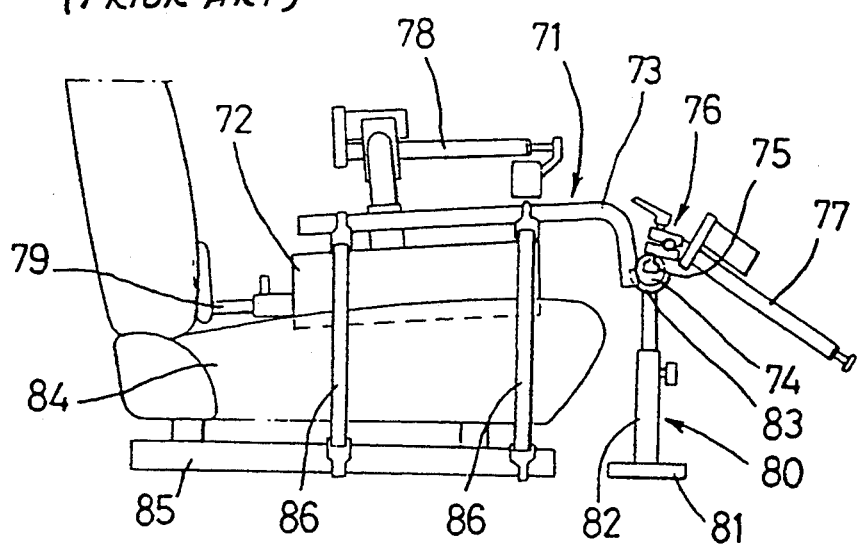
FIG. 15 is a front view showing the conventional example.

FIG. 14 shows said eighth preferred embodiment. In this preferred embodiment, engaging pins (not shown) at both ends of a back belt 52 extended along a back side of the back support 35 are engagedly inserted into engaging holes 55a provided in fitting bars 3a, 3b to fix the back of the body 2. Other constructions are the same as in the first preferred embodiment.

In addition, as obvious from the first to eighth preferred embodiments, the fitting means of the respective end portions of the belt 38 and the back belt 52 fixedly mounting the front side and the rear side of the body 2 on the driver's seat 33, respectively, the respective positions where the belt 38 and the back belt 52 are arranged and the like are optionally selected. And, the first to eighth preferred embodiments may be suitably combined.

In the robot for driving a automobile on a chassis dynamometer according to the present invention, connecting members, such as flexible belts, are mounted on the supporting member laid on the front portion of the body at end portions thereof and the engaging members to be engaged with the driver's seat and others are mounted on the other ends of the connecting members. Accordingly, since the engaging members of the belts can be engaged with the fixing portion and the like from the front side of the driver's seat, the engaging members can be easily and surely engaged. In addition, since the body is fixed by means of the connecting members from the front side thereof, there is not the possibility that the positions, where the connecting members are mounted on the supporting member, are shifted even though the force repeatedly acts upon the connecting members when for example pedaled by means of the actuators and thus the body can be held under the almost constant condition, so that the emission test and the fuel cost test can be improved in reproducibility and the shift can be correctly carried out to continue the mode driving.

What is claimed is:

1. A robot for driving a motor vehicle comprising:
   a robot body placed on the seat portion of a driver's seat of said motor vehicle;
   an actuator affixed to said robot body for operating the acceleration control of said motor vehicle;
   an actuator affixed to said robot body for operating the gear shift of said motor vehicle;
   an actuator affixed to said robot body for operating the clutch of said motor vehicle;
   mounting means including at least one tie down strap attached to said robot body and extending in front of said driver's seat of said motor vehicle to mount said robot body to said driver's seat; and
   at least one pedestal attached to said robot body in front of said driver's seat to rest against the floor of said motor vehicle and prevent the downward rotation of said robot body.

2. A robot for driving a motor vehicle on a chassis dynamometer wherein said motor vehicle includes a driver's seat assembly secured to the body of said motor vehicle, said driver's seat assembly including a seat and back support, said robot comprising:
   a robot body placed on said seat of said driver's seat assembly and having actuators oriented for operating respective pedals and shift means of said motor vehicle;
   a support rod attached to said robot body; and
   mounting means releasibly securing said robot body to said driver's seat assembly including at least one tie down strap having one end thereof mounted on said support rod and the other end thereof provided with a connecting hook member for engaging with said driver's seat assembly.

* * * * *